(12) United States Patent
Pereira et al.

(10) Patent No.: US 9,404,822 B2
(45) Date of Patent: *Aug. 2, 2016

(54) TENSION SENSOR ASSEMBLY

(71) Applicant: US Tower Corporation, Woodlake, CA (US)

(72) Inventors: Ken Pereira, Woodlake, CA (US); Mark Crawford, Visalia, CA (US)

(73) Assignee: US Tower Corporation, Linconln, KS (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/317,105

(22) Filed: Jun. 27, 2014

(65) Prior Publication Data

US 2014/0306829 A1    Oct. 16, 2014

Related U.S. Application Data

(63) Continuation of application No. 13/284,756, filed on Oct. 28, 2011, now Pat. No. 8,766,812.

(60) Provisional application No. 61/407,562, filed on Oct. 28, 2010.

(51) Int. Cl.
| | |
|---|---|
| *G01L 5/10* | (2006.01) |
| *B66B 5/12* | (2006.01) |
| *B66B 5/14* | (2006.01) |

(52) U.S. Cl.
CPC . *G01L 5/102* (2013.01); *B66B 5/12* (2013.01); *B66B 5/14* (2013.01); *G01L 5/107* (2013.01); *G01L 5/101* (2013.01); *G01L 5/103* (2013.01)

(58) Field of Classification Search
CPC ............. G01L 5/101–5/107; B66B 5/12–5/14; B66D 3/18; B66C 1/0212–1/0275
See application file for complete search history.

(56) References Cited

U.S. PATENT DOCUMENTS

| | | | | |
|---|---|---|---|---|
| 4,046,355 | A | | 9/1977 | Martin |
| 4,309,854 | A | | 1/1982 | Verdramini |
| 4,318,533 | A | * | 3/1982 | Port ....................... B65H 59/38                                          254/273 |
| 4,420,917 | A | * | 12/1983 | Parlanti ................... E04H 12/34                      254/346 |
| 4,679,771 | A | * | 7/1987 | Johnson .................. F41A 23/46                      188/5 |
| 4,787,524 | A | * | 11/1988 | Cobb, III ................. B66D 1/58                     212/262 |
| 4,895,348 | A | * | 1/1990 | Craig ....................... B66D 1/50                     254/269 |
| 4,928,925 | A | | 5/1990 | Christison |
| 4,983,145 | A | | 1/1991 | Hirai et al. |
| 5,048,826 | A | * | 9/1991 | Ryan ................ A63B 21/00181                     482/104 |
| 5,101,215 | A | | 3/1992 | Creaser, Jr. |
| 5,160,055 | A | * | 11/1992 | Gray ....................... B66C 23/90                     212/278 |
| 5,193,463 | A | | 3/1993 | Kunczynski |
| 5,579,931 | A | * | 12/1996 | Zuehlke ................... B66C 13/18                     212/274 |

(Continued)

*Primary Examiner* — Hai Phan
*Assistant Examiner* — Orlando Bousono
(74) *Attorney, Agent, or Firm* — Leech Tishman Fuscaldo & Lampl; Kenneth D'Alessandro, Esq.

(57) ABSTRACT

A tension detector may detect and help correct tension in a lift cable. The cable may include a lift cable within a telescopic structure, such as a telescopic tower. The tension sensor may detect when the cable tension is outside a high tension threshold and a low tension threshold and trigger an alert when outside the thresholds. The alert may be an audible alert or a visual alert. A controller may prevent a user from making the tension worse and encourage an operator to correct the tension problem by preventing a winch from expanding or retracting the telescopic structure. The tension sensor may use springs to calibrate the thresholds for the high tension and low tension and a series of pulleys to manipulate an arm to engage a tension sensor.

31 Claims, 7 Drawing Sheets

(56) References Cited

U.S. PATENT DOCUMENTS

| | | | |
|---|---|---|---|
| 6,311,571 B1 | 11/2001 | Norton | |
| 6,386,513 B1* | 5/2002 | Kazerooni | B66C 1/0212 212/285 |
| 2002/0026839 A1 | 3/2002 | Lehtovaara | |
| 2002/0095878 A1 | 7/2002 | Henderson | |
| 2002/0100899 A1* | 8/2002 | Kazerooni | B66C 1/0212 254/266 |
| 2002/0184824 A1* | 12/2002 | McCartney | E05D 13/00 49/322 |
| 2003/0089544 A1 | 5/2003 | Greib | |
| 2003/0155166 A1 | 8/2003 | Sullivan et al. | |
| 2003/0189197 A1* | 10/2003 | Kazerooni | B66C 1/0212 254/266 |
| 2003/0226403 A1 | 12/2003 | Rogers, Jr. et al. | |
| 2004/0040926 A1 | 3/2004 | Irsch et al. | |
| 2004/0052582 A1 | 3/2004 | Becker | |
| 2004/0245761 A1 | 12/2004 | Maloney et al. | |
| 2004/0251366 A1 | 12/2004 | Hison et al. | |
| 2005/0043130 A1 | 2/2005 | Hao et al. | |
| 2005/0179020 A1* | 8/2005 | Taylor | B66D 3/18 254/270 |
| 2009/0101475 A1* | 4/2009 | Nguyen | B65G 23/44 198/617 |
| 2009/0110527 A1* | 4/2009 | Kardohely | E04H 12/182 414/567 |
| 2010/0051767 A1* | 3/2010 | Erel | B66C 23/02 248/205.1 |

\* cited by examiner

US 9,404,822 B2

TENSION SENSOR ASSEMBLY

CROSS REFERENCE TO RELATED APPLICATIONS

This application is a continuation application of U.S. patent application Ser. No. 13/284,756, filed Oct. 28, 2011, which claims the benefit of U.S. Provisional Patent Application No. 61/407,562, filed Oct. 28, 2010, the disclosures of which are incorporated herein by reference in their entirety.

BACKGROUND

Telescoping towers may be raised and lowered by operators controlling an electronic winch. When raising a telescoping tower using a winch, an operator may raise a tower section into position on the tower and secure the tower section with safety locks at the top of the base section. Guy cables may then be attached and tensioned to the first tower section.

Operators often make procedural mistakes when raising or lowering a telescoping tower section using a winch. For example, an operator may fail to secure a first tower section with safety locks at the top of the base section. As a result, guy cable tension may exert force against the winch which may overwhelm the winch. In addition to causing high tension conditions, operator error in using a winch may cause a low tension condition which could also damage the telescoping tower or supporting equipment.

What is needed is an improved system for managing tension in raising and lowering telescoping towers.

SUMMARY OF THE INVENTION

The present technology includes a tension detector may detect and help correct tension in a lift cable. The cable may include a lift cable within a telescopic structure, such as a telescopic tower. The tension sensor may detect when the cable tension is outside a high tension threshold and a low tension threshold and trigger an alert when outside the thresholds. The alert may be an audible alert or a visual alert. A controller may prevent a user from making the tension worse and encourage an operator to correct the tension problem by preventing a winch from expanding or retracting the telescopic structure. The tension sensor may use springs to calibrate the thresholds for the high tension and low tension and a series of pulleys to manipulate an arm to engage a tension sensor.

An embodiment includes a tension sensor having a housing, a low tension sensor mechanism, a high tension sensor mechanism, and an alert mechanism. The low tension sensor mechanism may be coupled to the housing and configured to receive the lift cable. The high tension sensor mechanism may be coupled to the housing and configured to receive the lift cable. The alert mechanism provides an alert when the low tension sensor mechanism detects a tension below a low tension threshold or the high tension sensor mechanism detects a tension above a high tension threshold.

An embodiment includes a system for sensing tension. The system includes a telescopic structure, a lift cable, a winch and a tension sensor. The winch controls the movement of the lift cable in the telescopic structure. The tension sensor receives the lift cable and detect when a tension in the lift cable is outside a specified tension range.

An embodiment includes a method for sensing tension in a lift cable used in a telescopic structure. The method may include operating a lift cable using a winch controlled by a controller. The lift cable may be configured to raise and lower a telescopic structure, such that the lift cable having a tension sensor attached to the lift cable. A tension may be detected in the lift cable by the tension sensor, the tension being outside a tension range. Triggering an alert by the tension sensor.

DETAILED DESCRIPTION

The present invention detects tension in a cable. The cable may include a lift cable within a telescopic structure, such as a telescopic tower. The tension sensor may detect when the cable tension is outside a high tension threshold and a low tension threshold and trigger an alert when outside the thresholds. The alert may be an audible alert or a visual alert. A controller may prevent a user from making the tension worse and encourage an operator to correct the tension problem by preventing a winch from expanding or retracting the telescopic structure. The tension sensor may use springs to calibrate the thresholds for the high tension and low tension and a series of pulleys to manipulate an arm to engage a tension sensor.

Figure 1:
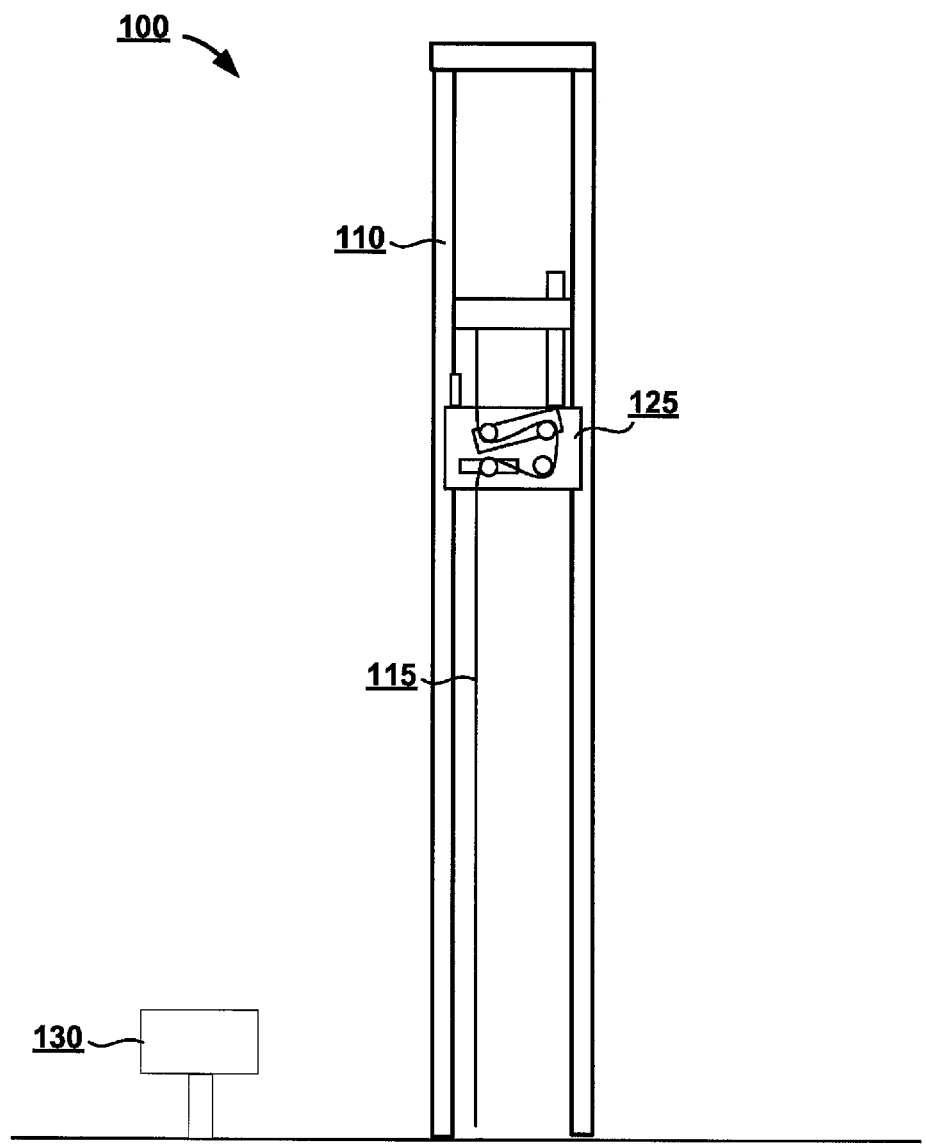
FIG. 1 illustrates an exemplary system for sensing tension in a lift cable.

FIG. 1 illustrates an exemplary system for sensing tension in a lift cable. The system of FIG. 1 includes a telescopic structure 110, cable support 120, tension sensor 125, lift cable 115, and controller 130. Lift cable 115 extends from cable support 120 down the length of the telescopic structure 110. The telescopic structure may be a telescopic tower or other structure. A winch (not illustrated) may be used to raise and lower the telescopic structure 110.

Controller 130 may be in communication with the winch and be used to operate the winch to raise and lower the lift cable. Controller 130 may include one a cable high tension visual sensor, cable low tension visual sensor, cable high tension audio sensor, controls for operating a winch coupled to the lift cable, and other inputs and outputs. The controller may include or control electric motors such as a tower winch. The controller may be integrated into the tower or be implemented remotely from the tower.

Figure 2:
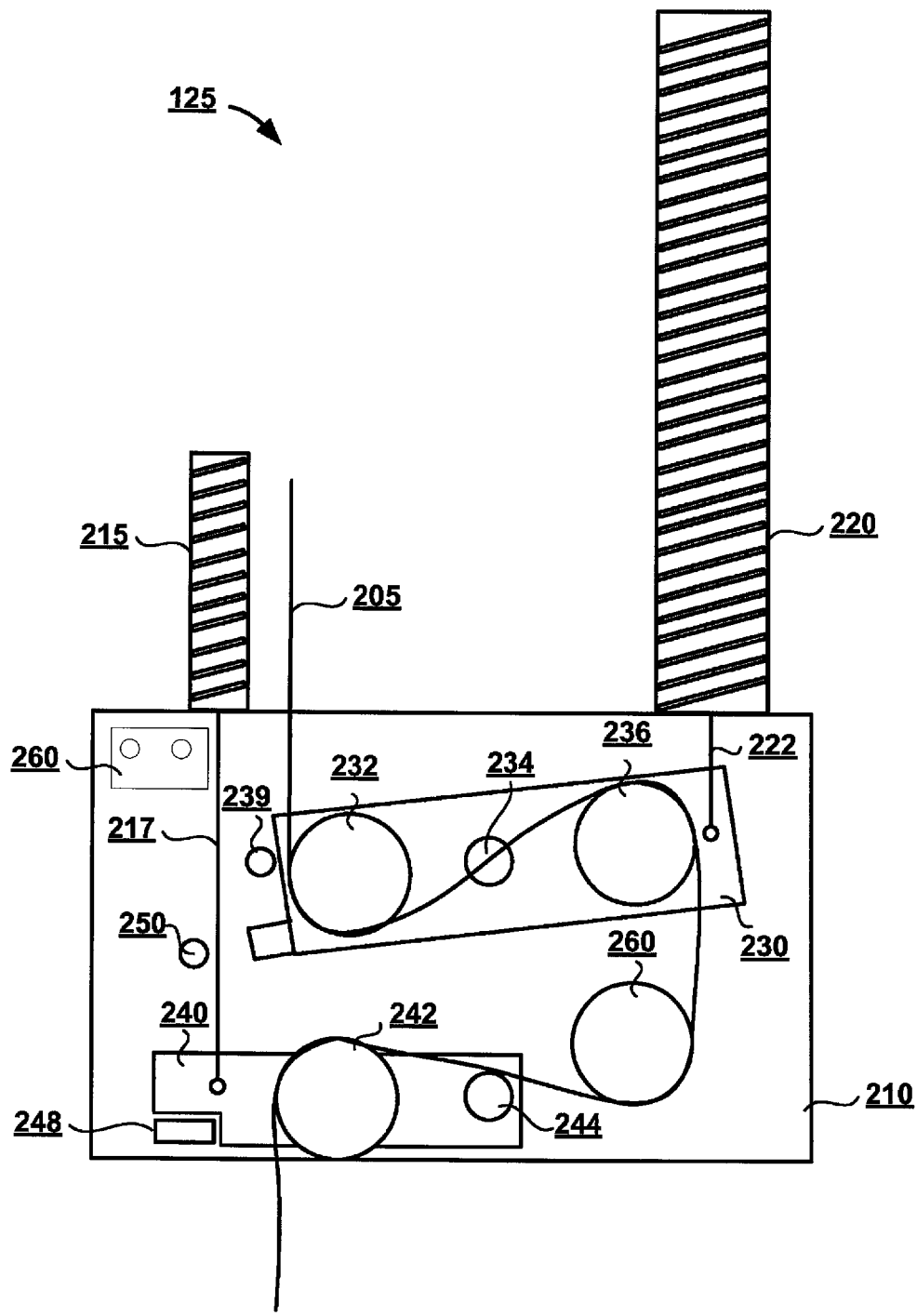
FIG. 2 illustrates an exemplary tension sensor for a cable having a normal tension.

FIG. 2 illustrates an exemplary tension sensor 125 for a cable having a normal tension. The tension sensor of FIG. 2 may be used in the tension sensing system of FIG. 1. Tension sensor 125 may include an assembly 210, a low tension spring 215, a high tension spring 220, a high tension arm 230, high tension pulleys 232 and 236, a high tension arm pivot 234, a high tension sensor 239, a low tension arm 240, a low tension pulley 242, low tension arm pivot 244, low tension block 248, low tension sensor 250, and idler pulley 260.

Lift cable 205 is routed below pulley 232 in a counter clockwise direction and above pulley 236 in a clockwise direction. Lift cable continues below pulley 250 in a clockwise direction and above pulley 242 in a counter-clockwise direction. Pulleys 232 and 236 are implemented on high tension bar 230 and pulley 242 is implemented on low tension bar 240.

The thresholds for triggering an alert are determined tension springs. High tension spring is coupled to an end of high tension arm 230 near pulley 236 and determines the threshold for triggering a high tension alert. Low tension spring is coupled to an end of low tension arm 240 near pulley above tension block 248 and determines the threshold for triggering a low tension alert.

Alert panel 260 may provide a visual or audible alert in response to a tension sensor being engaged. The alerts may be provided in place of or in addition to alerts generated on controller 130.

Figure 3:
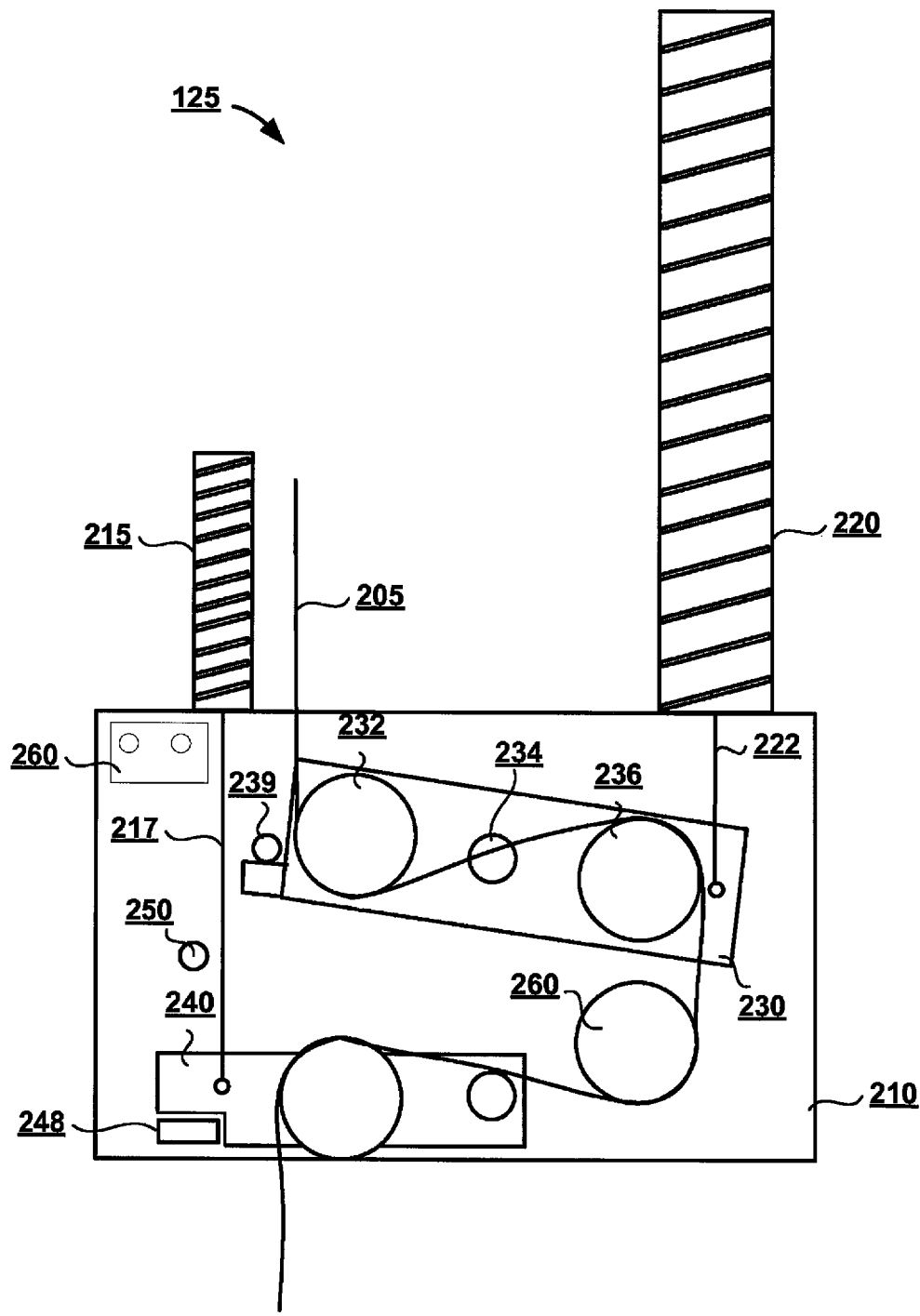
FIG. 3 illustrates an exemplary tension sensor for a cable having a high tension.

FIG. 3 illustrates an exemplary tension sensor for a cable having a high tension. When the tension applied to high tension pulleys 232 and 236 by lift cable 205 is great enough to overcome the tension applied to high tension pulleys 232 and 236 from high tension spring 220 (attached to high tension arm 230), high tension arm 230 rotates clockwise along pivot 234 to engage high tension sensor 239.

When high tension sensor 230 is engaged, an alert is generated. The alert may be an audio alert, a visual alert (such as an LED or a screen message), or both, indicating that the tension in the lift cable is too high. In response to the alert, controller 130 (FIG. 1) will automatically prevent the winch from extending the telescopic structure. Preventing extension of the telescopic structure prevents further tension increase and requires an operator to reduce the tension in the lift cable. When the high tension arm no longer engages the high tension sensor 239 (is not longer in contact with the sensor), the controller may allow the winch to extend the telescopic structure.

Figure 4:
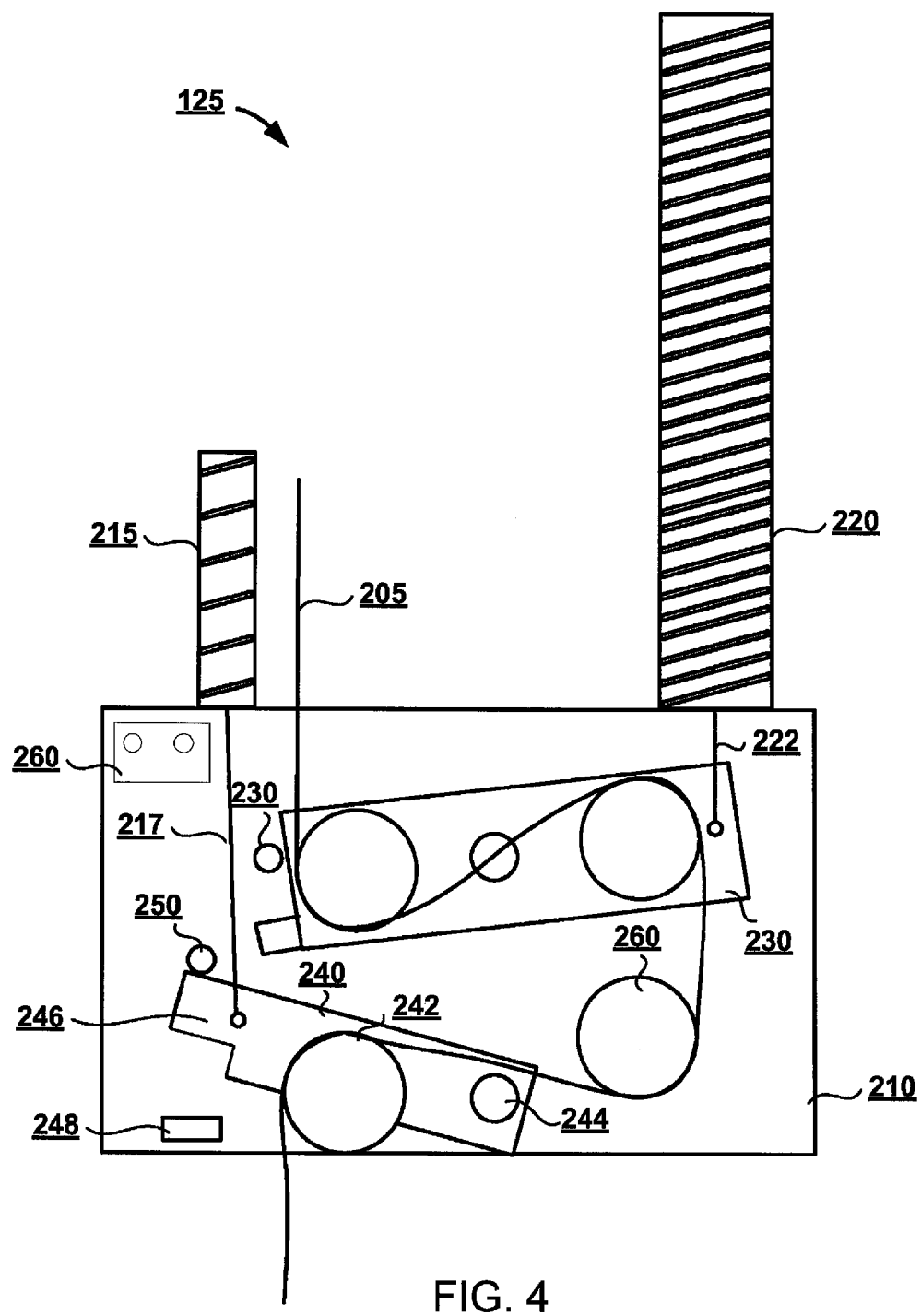
FIG. 4 illustrates an exemplary tension sensor for a cable having a low tension.

FIG. 4 illustrates an exemplary tension sensor for a cable having a low tension. When the tension applied to low tension pulley 242 by lift cable 205 is small enough to be overcome by the tension applied to low tension pulley 242 from low tension spring 215 (attached to low tension arm 240), low tension arm 230 rotates clockwise along pivot 244 to engage low tension sensor 240.

When low tension sensor 240 is engaged, an alert is generated. The alert may be an audio alert, a visual alert (such as an LED or a screen message), or both, indicating that the tension the lift cable is too little. In response to the alert, controller 130 (FIG. 1) will automatically prevent the winch from retracting the telescopic structure. Preventing retraction of the telescopic structure prevents further tension decrease and requires an operator to increase the tension in the lift cable. When the low tension arm no longer engages the low tension sensor 240 (is not longer in contact with the sensor), the controller may allow the winch to retract the telescopic structure.

Figure 5:
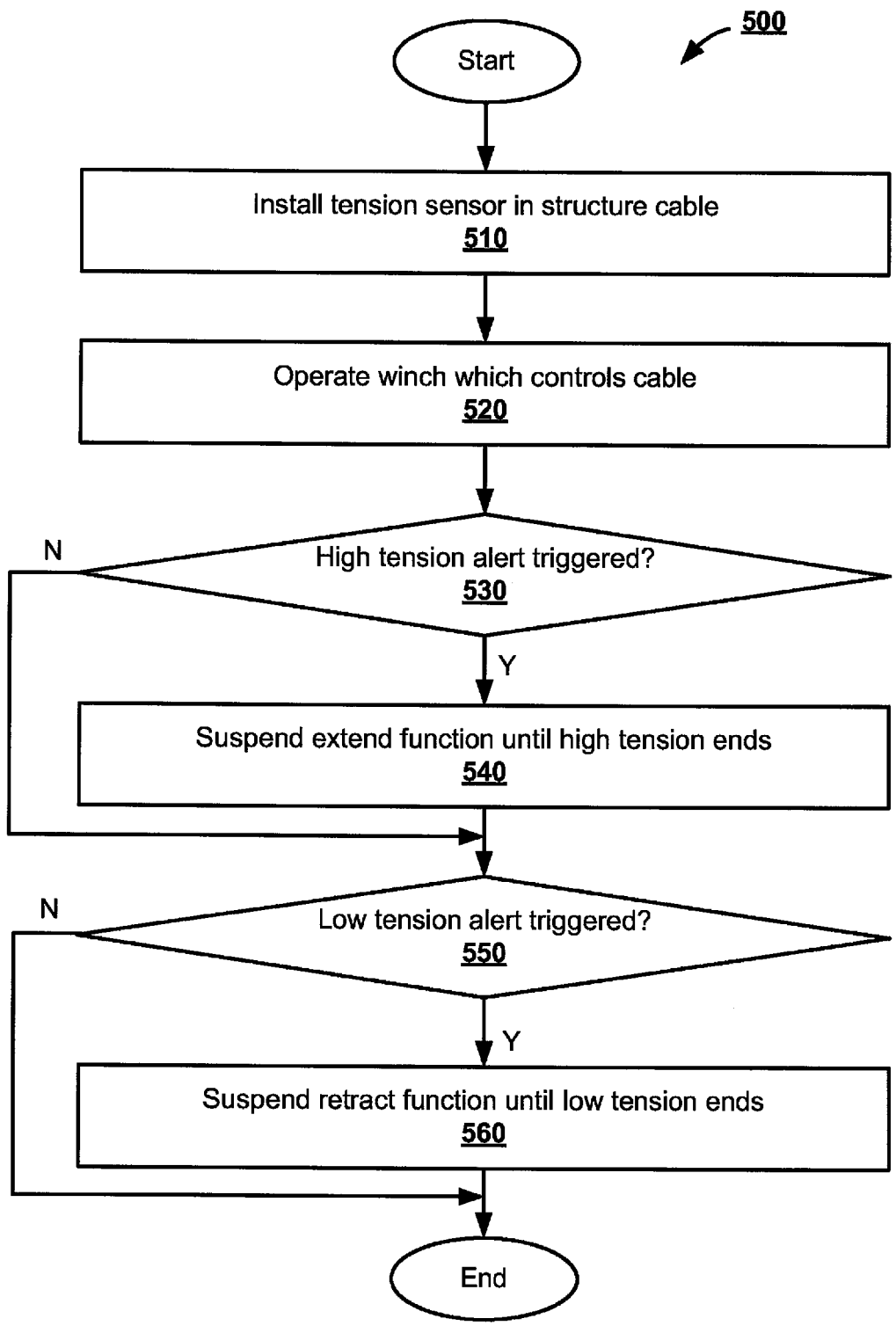
FIG. 5 illustrates an exemplary method for sensing tension in a cable.

FIG. 5 illustrates an exemplary method for sensing tension in a cable. The method of FIG. 5 may be performed by the system of FIG. 1. A tension sensor is installed in a telescopic structure lift cable at step 510. Installing a tension sensor in a cable includes routing the cable through a series of pulleys within the tension sensor, as discussed above with respect to FIG. 2.

An operator may operate a winch which controls the cable at step 520. The winch may be operated through controller 130. Operating the winch may include retracting and extending the telescopic structure using the lift cable.

A determination is made as to whether a high tension alert is triggered at step 530. A high tension alert may be triggered if the tension in the lift cable is greater than a threshold level. For example, tensioning a telescopic structure without locking structure portions in place may create a high tension. Determining whether a high tension alert is triggered is discussed in more detail below with respect to FIG. 6. If high tension alert is triggered at step 530, extending the telescopic structure may be suspended until the high tension is reduced below the threshold at step 540. For suspending the extension function of the telescopic structure, an operator may only retract the telescopic structure, which will reduce the high tension in the cable. The method of FIG. 5 then continues to step 550. If a high tension alert is not triggered, the method of FIG. 5 continues from step 530 to step 550.

A determination is made as to whether a low tension alert is triggered at step 550. A low tension alert may be triggered if the tension in the lift cable is less than a threshold level. For example, attempting to lower a telescopic structure without unlocking structure portions in place may create a low tension (slack in the cable). Determining whether a low tension alert is triggered is discussed in more detail below with respect to FIG. 7. If low tension alert is triggered at step 550, retracting the telescopic structure may be suspended until the low tension is increased to a point above the low tension threshold at step 560. For suspending the extension function of the telescopic structure, an operator may only expand the telescopic structure, which will increase the low tension in the cable. The method of FIG. 5 then ends. If a high tension alert is not triggered, the method of FIG. 5 ends.

Figure 6:
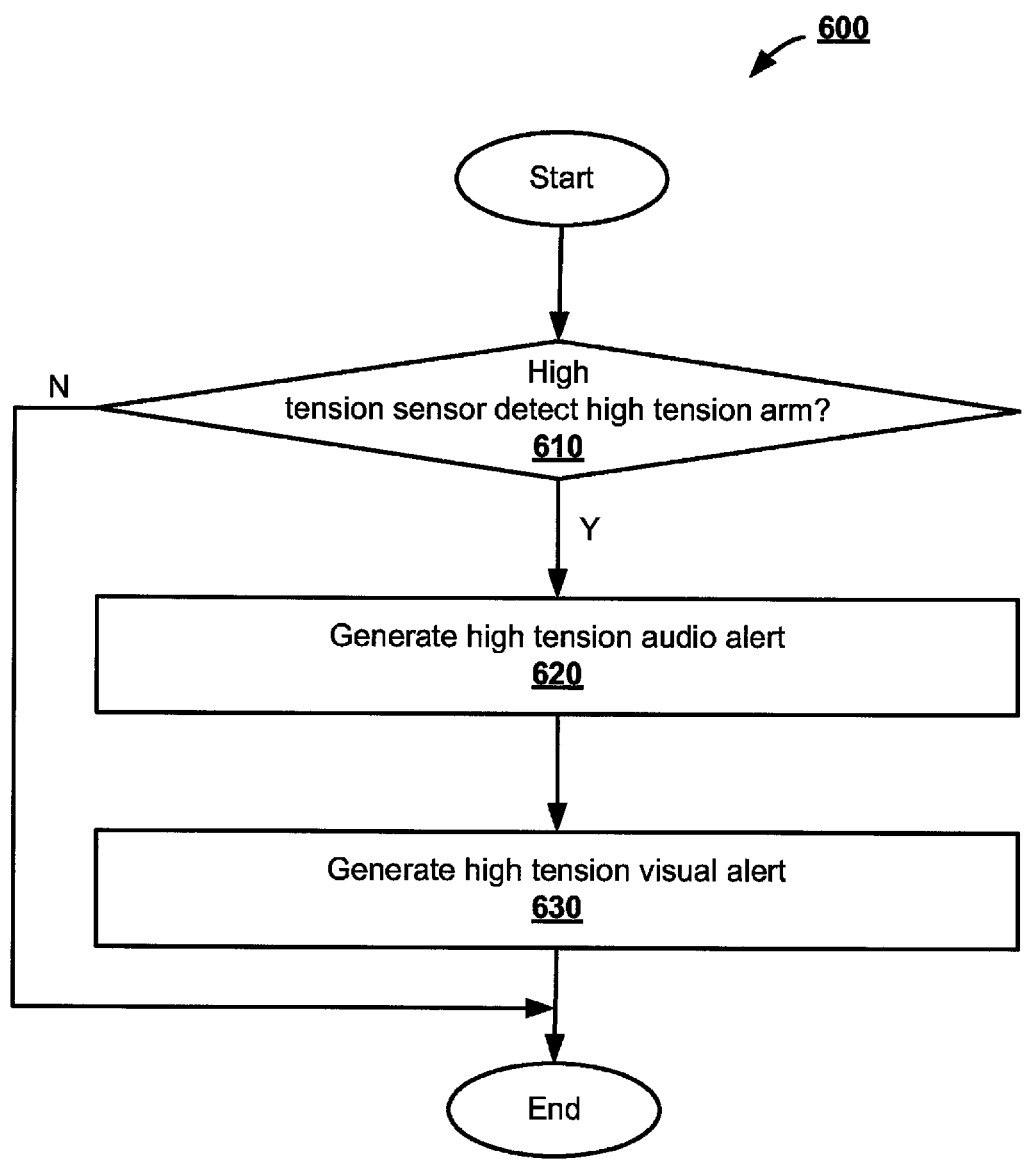
FIG. 6 illustrates an exemplary method for triggering a high tension alert.

FIG. 6 illustrates an exemplary method for triggering a high tension alert. The method of FIG. 6 provides more detail for step 530 of the method of FIG. 5. A determination is made as to whether a high tension sensor detects a high tension arm at step 610. When tension is increased in the lift cable which is routed through a tension sensor, the high tension arm rotates clockwise such that an arm end rotates close high tension sensor 239. If the high tension arm rotates clockwise and engages (e.g., touches) the high tension sensor, the high tension arm is detected at step 610 and the method of FIG. 6 continues to step 620. If the high tension arm does not engage the high tension sensor, the method of FIG. 6 ends.

A high tension audio alert is generated at step 620. The high tension audio alert may be generated at the controller 130, the tension sensor 210, and at other devices. A high tension visual alert is generated at step 630. The visual alert may include a series of one or more lights or LEDs, a graphical display, or some other visual output device. After generating the high tension visual alert, the method of FIG. 6 ends.

Figure 7:
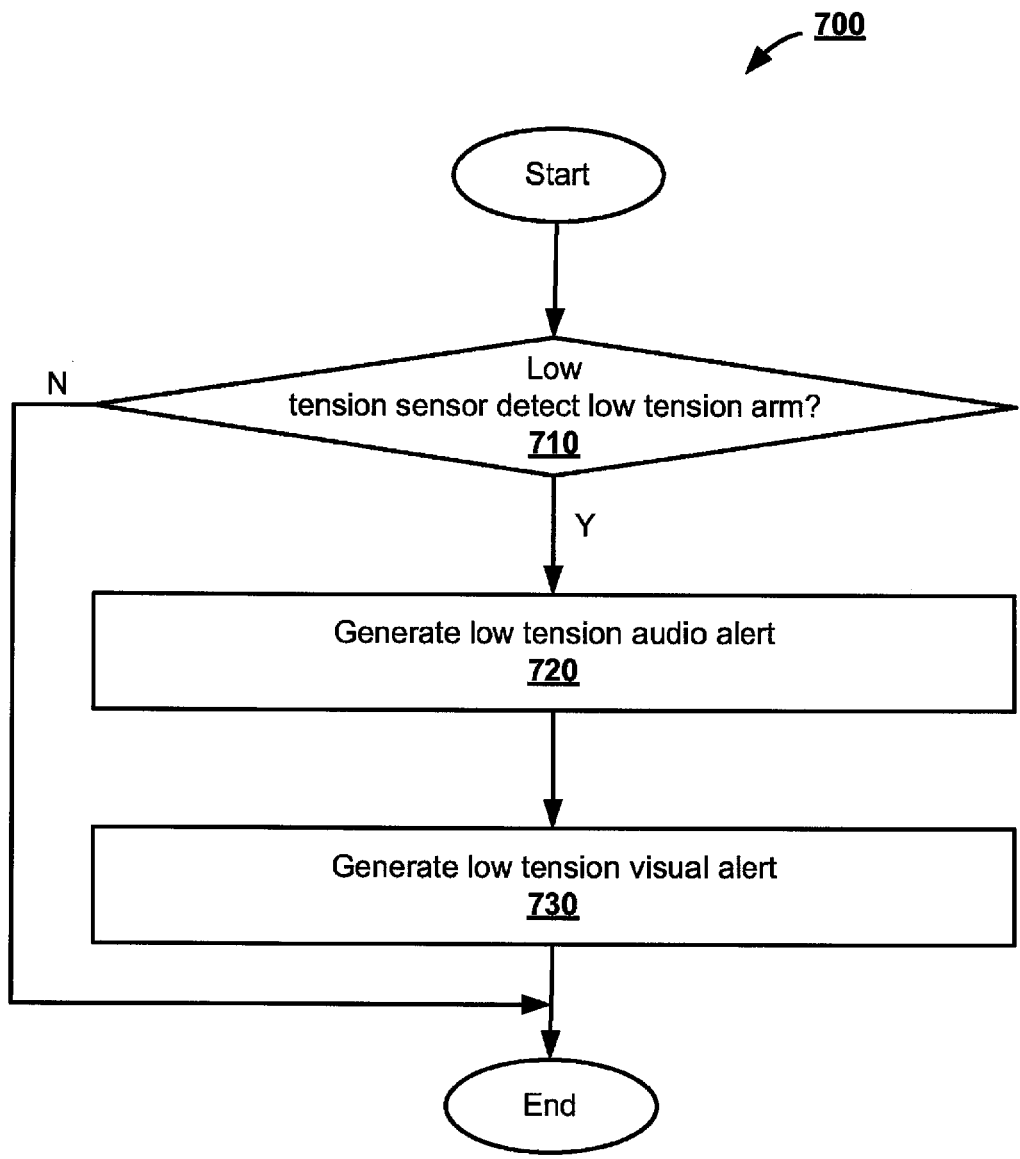
FIG. 7 illustrates an exemplary method for triggering a low tension alert.

FIG. 7 illustrates an exemplary method for triggering a low tension alert. The method of FIG. 6 provides more detail for step 550 of the method of FIG. 5. A determination is made as to whether a low tension sensor detects a low tension arm at step 710. When tension is decreased in the lift cable which is routed through a tension sensor, the low tension arm rotates clockwise such that an arm end rotates towards low tension sensor 250. If the low tension arm 240 rotates clockwise and engages (e.g., touches) the low tension sensor 250, the low tension arm is detected at step 710 and the method of FIG. 7 continues to step 720. If the low tension arm does not engage the low tension sensor, the method of FIG. 6 ends.

A low tension audio alert is generated at step 620. The low tension audio alert may be generated at the controller 130, the tension sensor 210, and at other devices. A low tension visual alert is generated at step 630. The visual alert may include a series of one or more lights or LEDs, a graphical display, or some other visual output device. After generating the high tension visual alert, the method of FIG. 6 ends.

The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A tension sensor system for sensing cable tension comprising:
   a high-tension arm having a first pulley mounted at a first end of the high-tension arm and a second pulley mounted on a second end of the high-tension arm opposite the first end of the high-tension arm, the high-tension arm mounted on a first pivot disposed between the first pulley and the second pulley, the high-tension arm biased to rotate the high-tension arm along a first arc in a first direction;
   the first pulley adapted to receive a cable such that tension on the cable exerts a force on the first pulley to rotate the high-tension arm along the first arc in a second direction opposite the first direction along the first arc;
   the second pulley adapted to receive the cable from the first pulley, such that tension on the cable exerts a force on the second pulley to rotate the high-tension arm about the first pivot in the second direction, such that a total force to rotate the high-tension arm about the first pivot in the second direction is a function of force provided by the first pulley and the second pulley; and
   a high-tension sensor configured to output a signal when the high-tension arm rotates along the first arc in the second direction to a high-tension position.

2. The tension sensor system of claim 1, wherein the high-tension arm is biased by a spring.

3. The tension sensor system of claim 1, further comprising:
   a low-tension arm mounted on a second pivot disposed at a first end of the low-tension arm and biased to rotate the low-tension arm along a second arc in a first direction;
   a low-tension pulley mounted on the low-tension arm at a second end of the low-tension arm opposite the first end of the low-tension arm and adapted to receive the cable from the second pulley mounted to the high-tension arm, such that tension on the cable exerts a force on the low-tension pulley to rotate the low-tension arm along the second arc in a second direction opposite the first direction along the second arc; and
   a low-tension sensor configured to output a signal when the low-tension arm rotates along the second arc in the second direction to a low-tension position.

4. The tension sensor system of claim 3, wherein the low-tension arm is biased by a second spring.

5. The tension sensor system of claim 3, wherein the low-tension sensor is configured to detect a tension below a low-tension threshold when the force to rotate the low-tension arm along the second arc in the second direction is less than a biasing force that biases the low-tension arm along the second arc in the first direction, by an amount that causes the low-tension arm to rotate to or past the low-tension position.

6. The tension sensor system of claim 1, wherein the high-tension sensor is configured to detect a tension above a high-tension threshold when the total force to rotate the high-tension arm along the first arc in the second direction is greater than a biasing force that biases the high-tension arm along the first arc in the first direction, by an amount that causes the high-tension arm to rotate to or past the high-tension position.

7. The tension sensor system of claim 1, further comprising an alert mechanism coupled to the high-tension sensor and activated in response to a signal from the high-tension sensor.

8. The tension sensor system of claim 7, wherein the alert mechanism provides an audio alert or a visual alert.

9. The tension sensor system of claim 1, wherein the cable is under tension and is engaged with the first pulley and the second pulley.

10. A tension sensor system for sensing tension of a cable comprising:
    a mounting structure configured to permit a cable to extend along a cable path therethrough from a first side of the mounting structure to a second side of the mounting structure opposite the first side of the mounting structure;
    a high-tension arm having a first pulley mounted at a first end of the high-tension arm and a second pulley mounted on a second end of the high tension arm opposite the first end of the high-tension arm, the high-tension arm pivotally mounted to the mounting structure by a first pivot disposed between the first pulley and the second pulley, the high-tension arm biased to exert a force to rotate the high-tension arm about the first pivot in a first direction;
    the first pulley adapted to receive the cable from the first side of the mounting structure, such that tension on the cable exerts a force on the first pulley to rotate the high-tension arm about the first pivot in a second direction opposite the first direction;
    the second pulley adapted to receive the cable from the first pulley, such that tension on the cable exerts a force on the second pulley to rotate the high-tension arm about the first pivot in the second direction, such that a total force to rotate the high-tension arm about the first pivot in the second direction is a function of force exerted on the first pulley and the second pulley; and
    a high-tension sensor configured to output a signal when the high-tension arm rotates about the first pivot in the second direction to a high-tension position.

11. The tension sensor system of claim 10, wherein the cable enters the first side of the mounting structure along a first axis that is generally parallel to a second axis along which the cable exits at the second opposite side of the mounting structure.

12. The tension sensor system of claim 10, wherein the high-tension sensor is configured to detect a tension above a high-tension threshold when the total force to rotate the high-tension arm about the first pivot in the second direction is sufficiently greater than the biasing force that biases the high-tension arm about the first pivot in the first direction, such that the high-tension arm rotates to or past the high-tension position.

13. The tension sensor system of claim 10, further comprising:
    a low-tension arm pivotally mounted to the mounting structure through a second pivot at a first end of the low-tension arm and biased to exert a force to rotate the low-tension arm about the second pivot in a first direction;
    a low-tension pulley mounted on the low-tension arm at a second end of the low-tension arm opposite the first end of the low-tension arm and adapted to receive the cable from the second pulley of the high-tension arm, such that tension on the cable exerts a force to rotate the low-tension arm about the second pivot in a second direction opposite the first direction about the second pivot; and a low-tension sensor configured to output a signal when the low-tension arm rotates about the second pivot in the second direction to a low-tension position.

14. The tension sensor system of claim 13, wherein the low-tension sensor is configured to detect a tension below a low-tension threshold when the force to rotate the low-tension arm about the second pivot in the second direction is less than the biasing force that biases the low-tension arm about the second pivot in the first direction, such that the low-tension arm rotates to or past the low-tension position.

15. The tension sensor system of claim 10, further comprising at least one idler pulley disposed along the cable path to direct the cable from the second pulley of the high-tension arm to the low-tension pulley.

16. The tension sensor system of claim 10, wherein the high-tension arm is biased by a spring.

17. A tension sensor system for sensing tension of a cable comprising:
    a high-tension sensor arm having a first pulley mounted at a first end of the high-tension sensor arm and a second pulley mounted on a second end of the high-tension sensor arm opposite the first end of the high-tension sensor arm, the high-tension sensor arm mounted on a first pivot disposed between the first pulley and the second pulley;
    a spring having a spring constant and coupled to the high-tension sensor arm to exert a first moment of force to rotate the high-tension sensor arm about the first pivot in a first direction;
    the first pulley adapted to receive a cable, wherein tension on the cable exerts a second moment of force to rotate the high-tension sensor arm about the first pivot in a second direction opposite the first direction;
    the second pulley adapted to receive the cable from the first pulley, wherein tension on the cable exerts the second moment of force to rotate the high-tension sensor arm about the first pivot in the second direction, such that the high-tension sensor arm is disposed in mechanical equilibrium at an angular position that is a function of the first moment of force to rotate the high-tension sensor arm in the first direction provided by the spring and the second moment of force to rotate the high-tension sensor arm in the second direction, which is a function of the second moment of force of the first pulley and the second pulley; and
    a high-tension sensor positioned to generate a signal when the high-tension sensor arm is at a preselected angular position.

18. The tension sensor system of claim 17, further comprising:
    a low-tension sensor arm mounted on a second pivot;
    a second spring having a second spring constant and coupled to the low-tension sensor arm to exert a third moment of force to rotate the low-tension sensor arm about the second pivot in a first direction;
    a low-tension arm pulley coupled to the low-tension sensor arm and adapted to receive the cable, wherein tension on the cable exerts a fourth moment of force to rotate the low-tension sensor arm about the second pivot in a second direction opposite the first direction about the second pivot, the low-tension sensor arm disposed in mechanical equilibrium at an angular position that is a function of the third moment of force and the fourth moment of force; and
    a low-tension sensor positioned to generate a signal when the low-tension sensor arm is at a preselected angular position.

19. A tension sensor system for sensing cable tension comprising:
    a mounting structure configured to permit a cable to extend along a cable path therethrough from a first side of the mounting structure to a second side of the mounting structure opposite the first side of the mounting structure;
    a high-tension arm having a first pulley mounted at a first end of the high-tension arm and a second pulley mounted on a second end of the high-tension arm opposite the first end of the high-tension arm, the high-tension arm mounted on a first pivot disposed between the first pulley and the second pulley, and biased to rotate the high-tension arm along a first arc in a direction away from a high-tension sensing position;
    the cable engaged around the first pulley in a first rotational direction and around the second pulley in a second rotational direction opposite the first rotational direction such that tension on the cable exerts a force on the first and second pulleys to rotate the high-tension arm along the first arc in a direction towards the high-tension sensing position; and
    a high-tension sensor positioned to sense when the high-tension arm rotates in the second rotational direction to the high-tension sensing position and to output a high-tension signal in response thereto.

20. The tension sensor system of claim 19, wherein the high-tension arm is biased by a first spring attached to the high-tension arm.

21. The tension sensor system of claim 20 wherein the first spring is attached to the second end of the high-tension arm.

22. The tension sensor system of claim 19, wherein the high-tension sensor is configured to detect a tension above a high-tension threshold when the force exerted by the cable on the first and second pulleys to rotate the high-tension arm in the direction towards the high-tension sensing position is greater than a biasing force that biases the high-tension arm in the direction away from the high-tension sensing position by an amount that causes the high-tension arm to rotate to or past the high-tension sensing position.

23. The tension sensor system of claim 19, further comprising an alert mechanism coupled to the high-tension sensor and activated in response to a signal from the high-tension sensor.

24. The tension sensor system of claim 23, wherein the alert mechanism provides an audio alert or a visual alert.

25. The tension sensor system of claim 19, further comprising:
    an idler pulley;
    a low-tension arm mounted on a second pivot at a first end of the low tension arm and biased to rotate the low-tension arm about the second pivot along a second arc in a direction towards a low-tension sensing position;
    a low-tension pulley mounted on the low-tension arm between the first end of the low-tension arm and a second end of the low-tension arm opposite the first end of the low tension arm; and
    a low-tension sensor positioned to sense when the low-tension arm rotates about the second pivot to the low-tension sensing position and to output a low-tension signal in response thereto;
    wherein the cable further extends from the second pulley, is engaged around the idler pulley in the second rotational direction and is engaged around the low-tension pulley in the first rotational direction such that tension on the cable exerts a force on the low-tension pulley to rotate the low-tension arm about the second pivot along the second arc in a direction away from the low-tension sensing position.

26. The tension sensor system of claim 25, wherein the low-tension arm is biased by a second spring attached to the low-tension arm.

27. The tension sensor system of claim 26 wherein the second spring is attached to the low-tension arm on the second end of the low-tension arm.

28. The tension sensor system of claim 25, wherein the low-tension sensor is configured to detect a tension below a low-tension threshold when the force exerted by the cable on the low-tension pulley to rotate the low-tension arm along the second arc in a direction away from the low-tension sensing position is less than a biasing force that biases the low-tension arm along the second arc in a direction towards the low-tension sensing position by an amount that causes the low-tension arm to rotate to or past the low-tension sensing position.

29. The tension sensor system of claim 25, further comprising an alert mechanism coupled to the low-tension sensor and activated in response to a signal from the low-tension sensor.

30. The tension sensor system of claim 29, wherein the alert mechanism provides an audio alert or a visual alert.

31. The tension sensor system of claim 25 wherein an orientation of the cable received at the first side of the mounting structure is generally parallel to an orientation of the cable received at the second side of the mounting structure.

* * * * *